US012223687B2

United States Patent
Ono et al.

(10) Patent No.: US 12,223,687 B2
(45) Date of Patent: Feb. 11, 2025

(54) IMAGE PROCESSING DEVICE, COMPONENT MOUNTING SYSTEM, AND IMAGE PROCESSING METHOD

(71) Applicant: FUJI CORPORATION, Chiryu (JP)

(72) Inventors: Keiichi Ono, Anjo (JP); Kazuya Kotani, Toyota (JP); Tomoya Fujimoto, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 367 days.

(21) Appl. No.: 17/770,194

(22) PCT Filed: Nov. 6, 2019

(86) PCT No.: PCT/JP2019/043463
§ 371 (c)(1),
(2) Date: Apr. 19, 2022

(87) PCT Pub. No.: WO2021/090395
PCT Pub. Date: May 14, 2021

(65) Prior Publication Data
US 2022/0392190 A1     Dec. 8, 2022

(51) Int. Cl.
*G06T 7/90*     (2017.01)
*G06T 5/50*     (2006.01)
*G06V 10/56*    (2022.01)

(52) U.S. Cl.
CPC ............... *G06V 10/56* (2022.01); *G06T 5/50* (2013.01); *G06T 7/90* (2017.01); *G06T 2207/10024* (2013.01)

(58) Field of Classification Search
None
See application file for complete search history.

(56) References Cited

U.S. PATENT DOCUMENTS

2006/0140471 A1* 6/2006 Murakami .............. G06T 7/001
                                                              382/145
2016/0203592 A1    7/2016 Amano et al.

FOREIGN PATENT DOCUMENTS

CN    109916906 A  *  6/2019  ....... G01N 21/95607
EP    0 370 435 A2    5/1990
(Continued)

OTHER PUBLICATIONS

International Search Report mailed on Feb. 4, 2020 in PCT/JP2019/043463 filed on Nov. 6, 2019, 2 pages.

*Primary Examiner* — Randolph I Chu
(74) *Attorney, Agent, or Firm* — Oblon, McClelland, Maier & Neustadt, L.L.P.

(57) ABSTRACT

An image processing device that processes a color image in which each pixel has gradation values of three primary colors of RGB includes an image acquiring section to acquire an image; a difference image generating section to use a first primary color image extracted from the color image and a second primary color image in which a gradation value of a second primary color except the first primary color is extracted from the color image, to generate a difference image; a recognition image generating section configured to generate a recognition image having a gradation value obtained by subtracting a gradation value of the difference image from a gradation value of an image in which any one of the three primary colors of RGB is extracted from the color image; and a recognition processing section configured to perform recognition processing of the recognition target using the recognition image.

7 Claims, 6 Drawing Sheets

(56) References Cited

FOREIGN PATENT DOCUMENTS

| JP | 10-89933 A | 4/1998 |
| JP | 2008-180696 A | 8/2008 |
| JP | 2010-175483 A | 8/2010 |

* cited by examiner

IMAGE PROCESSING DEVICE, COMPONENT MOUNTING SYSTEM, AND IMAGE PROCESSING METHOD

TECHNICAL FIELD

The present specification discloses an image processing device, a component mounting system, and an image processing method.

BACKGROUND ART

Conventionally, as an image processing device of this type, there has been proposed an image processing device that processes an image including a recognition target, in which RGB values (RGB pixel information) of each pixel are defined (see, for example, Patent Literature 1). In this device, RGB values of the recognition target that have to be extracted from the image and exclusion RGB values that have to be positively excluded, such as color which is easily mistaken for the recognition target, are set in advance. Then, pixels included in the exclusion RGB values are removed from the image and pixels included in the RGB values of the recognition target are extracted, thereby leaving only the image corresponding to the region of the recognition target and performing the inspection of the state of the recognition target and the like.

PATENT LITERATURE

Patent Literature 1: JP-A-2010-175483

BRIEF SUMMARY

Technical Problem

However, in the above-mentioned image processing device, the burden of the setting processing is large because it is necessary to set the RGB values of the recognition target and the exclusion RGB values in advance. In addition, even in a case where the RGB values and the exclusion RGB values are set in advance, it may be difficult to accurately extract the RGB values of the recognition target in a case where changes in a condition in which light strikes a target object and the like due to the orientation, the positional deviation, or the like of the target object when the image is actually captured give rise to the change in the RGB values.

A main object of the present disclosure is to accurately recognize a recognition target without setting RGB values of a part, which have to be excluded, in advance.

Solution to Problem

The present disclosure employs the following means in order to achieve the above-mentioned main object.

A gist of an image processing device of the present disclosure that processes a color image in which each pixel has gradation values of three primary colors of RGB, is an image processing device including: an image acquiring section configured to acquire an image including a recognition target and a similar part of which a main color component is different from a main color component of the recognition target and brightness is similar to brightness of the recognition target, as the color image; a difference image generating section configured to use a first primary color image in which a gradation value of a first primary color that is close to the main color component of the similar part, out of the three primary colors of RGB, is extracted from the color image and a second primary color image in which a gradation value of a second primary color except the first primary color is extracted from the color image, to generate a difference image having a gradation value based on a difference obtained by subtracting the gradation value of the second primary color image from the gradation value of the first primary color image; a recognition image generating section configured to generate a recognition image having a gradation value obtained by subtracting the gradation value of the difference image from a gradation value of an image in which any one of the three primary colors of RGB is extracted from the color image; and a recognition processing section configured to perform recognition processing of the recognition target using the recognition image.

Since the image processing device of the present disclosure generates the difference image having the gradation value based on the difference obtained by subtracting the gradation value of the second primary color image from the gradation value of the first primary color image, the gradation value of the difference image is based on the difference between the first primary color close to the main color component and the second primary color except the first primary color, in the similar part. Further, the recognition image is generated by subtracting the gradation value of the difference image from the gradation value of any one of the primary color images, so that it is possible to clearly show the difference in brightness between the recognition target and the similar part by reducing the brightness of the similar part in the recognition image. Therefore, it is possible to restrain the similar part from being erroneously recognized as the recognition target. Further, since each image used for processing is extracted or generated from an actually acquired color image, it is not necessary to set RGB gradation values, which have to be excluded, in advance. Accordingly, it is possible to accurately recognize the recognition target without setting the RGB gradation values, which have to be excluded, in advance.

DESCRIPTION OF EMBODIMENTS

Figure 1:
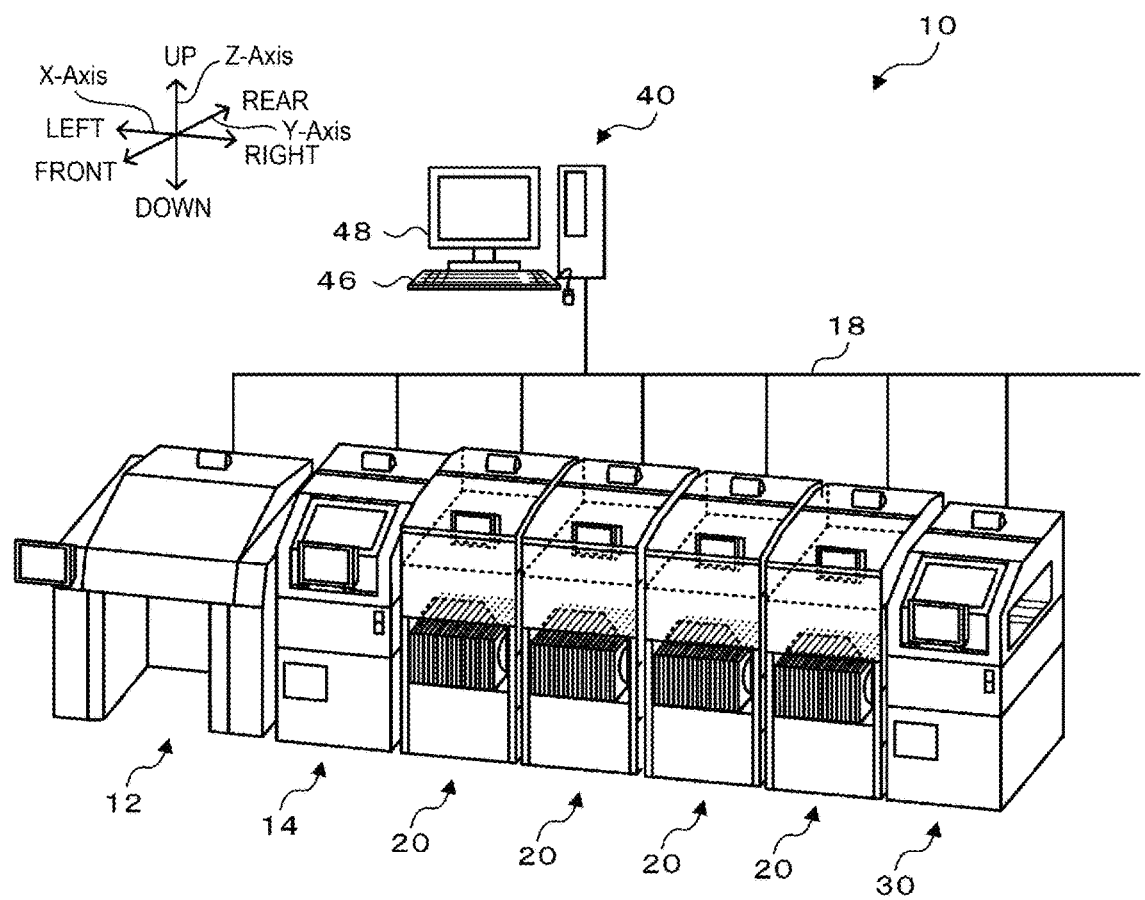
FIG. 1 is a view illustrating an example of component mounting system 10.
Figure 2:
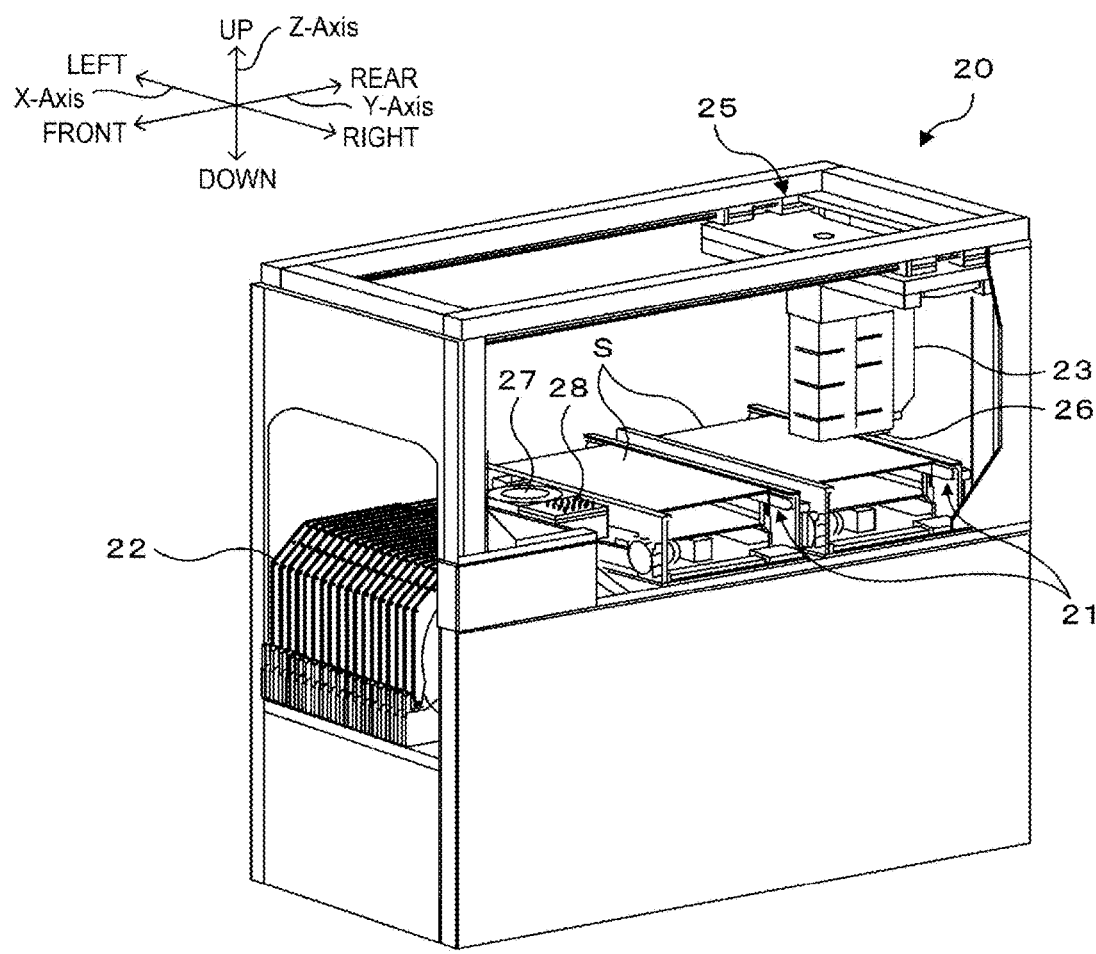
FIG. 2 is a configuration view showing an outline of a configuration of mounting device 20.
Figure 3:
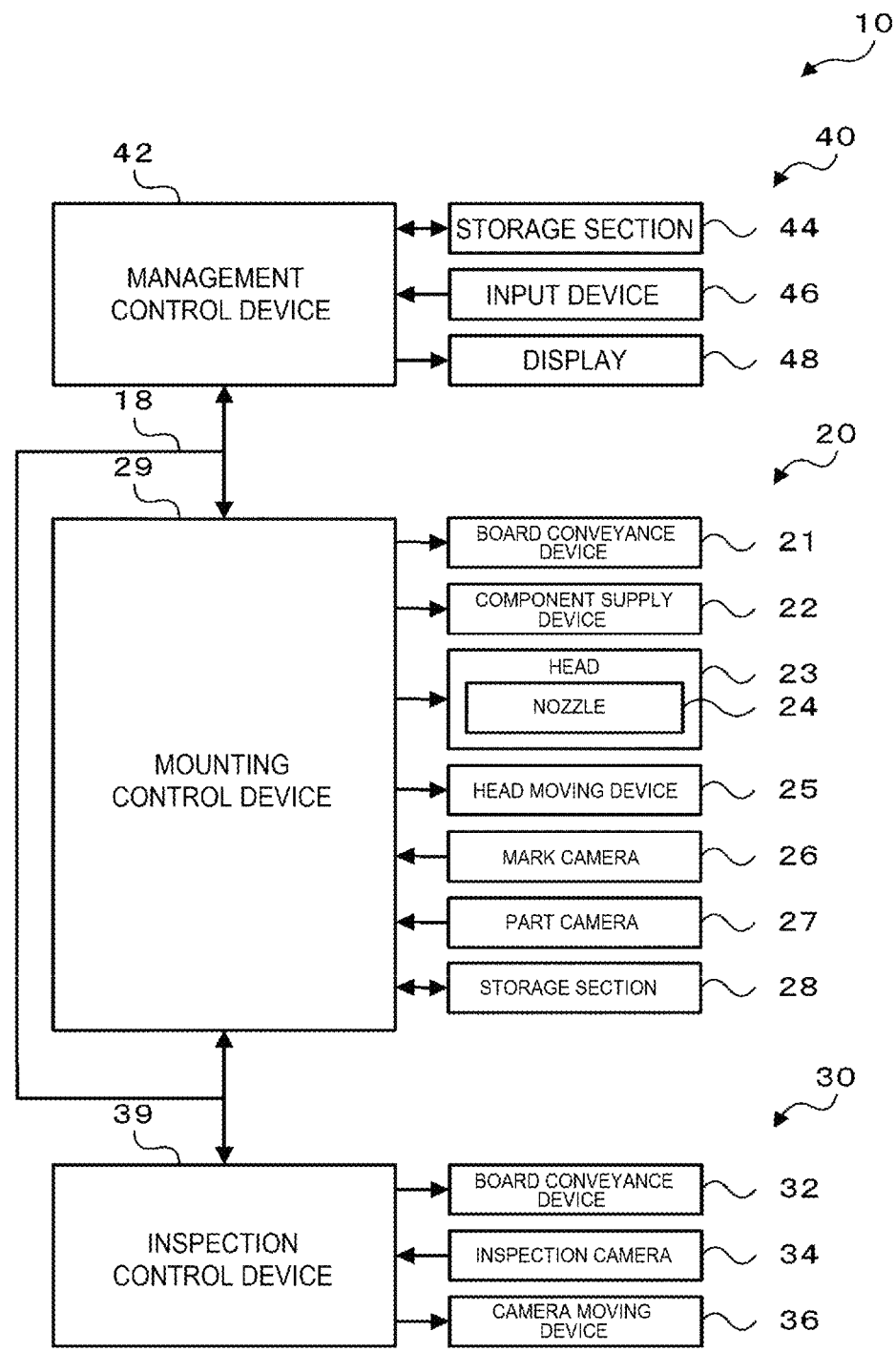
FIG. 3 is a diagram illustrating an electrical connection relationship between mounting device 20, management device 40, and mounting inspection device 30.

Next, embodiments of the present disclosure will be described with reference to the drawings. FIG. 1 is a configuration view showing an outline of a configuration of component mounting system 10, FIG. 2 is a configuration view showing an outline of a configuration of mounting device 20, and FIG. 3 is a diagram illustrating an electrical connection relationship between mounting device 20, management device 40, and mounting inspection device 30. In FIGS. 1 and 2, the right-left direction is an X-direction, the front-rear direction is a Y-direction, and the up-down direction is a Z-direction.

As shown in FIG. 1, component mounting system 10 includes printing device 12, print inspection device 14, multiple mounting devices 20, mounting inspection device 30, and management device 40, and these devices are connected to LAN 18 as a network. Printing device 12 prints on board S (see FIG. 2) by pushing solder into pattern holes formed in the screen mask. Print inspection device 14 inspects the state of the solder printed by printing device 12. Mounting devices 20 are disposed along the conveyance direction (X-direction) of board S, and mount components on board S or inspect the mounting state of the mounted component. Mounting inspection device 30 inspects the mounting state of the component that is mounted on board S by each mounting device 20. Management device 40 manages entire component mounting system 10. Printing device 12, print inspection device 14, multiple mounting devices 20, and mounting inspection device 30 are installed side by side in this order in the conveyance direction of board S to form a production line. In addition to these devices, the production line may be provided with a reflow device that performs a reflow process of board S on which the component is mounted or the like, and mounting inspection device 30 may be disposed on the downstream side of the reflow device.

As shown in FIGS. 2 and 3, mounting device 20 includes board conveyance device 21 that conveys board S, component supply device 22 that supplies the component, and head 23 in which nozzle 24 that picks up the component is disposed so as to be moved up and down, and head moving device 25 that moves head 23 in the XY-directions. Board conveyance device 21 has two pairs of conveyor belts provided with a gap therebetween in the front and rear of FIG. 2 and spanned in the right-left direction, and conveys board S from left to right in FIG. 2 using each conveyor belt. Component supply device 22 is, for example, a tape feeder that supplies components by sending out a tape in which the components are accommodated at a predetermined pitch, and multiple component supply devices 22 are set in mounting device 20 such that multiple types of components can be supplied.

In addition to these, mounting device 20 includes mark camera 26, part camera 27, storage section 28, and mounting control device 29 that controls entire mounting device 20. Mark camera 26 is attached to head 23 and is moved in the XY-directions together with head 23 by head moving device 25. Mark camera 26 images an imaging target, such as a mark affixed to board S, a component supplied by component supply device 22, a component mounted on board S, from above to generate an image, and outputs the generated image to mounting control device 29. Further, part camera 27 is installed between component supply device 22 and board conveyance device 21, and images the component held (picked up) by nozzle 24 from below to generate an image, and outputs the generated image to mounting control device 29. In the present embodiment, mark camera 26 includes at least a color imaging element, and is configured to image a color image in which each pixel has gradation values (R, G, B) of three primary colors of RGB. The gradation values (R, G, B) each take values of 256 levels from 0 to 255. Storage section 28 is a device such as an HDD that stores information regarding a processing program and a mounting position of the component, and information such as a mounting result.

Mounting control device 29 is constituted of a well-known CPU, ROM, RAM, and the like. Mounting control device 29 outputs drive signals to board conveyance device 21, head 23, head moving device 25, and the like. Images from mark camera 26 and part camera 27 are input to mounting control device 29. Mounting control device 29 processes the image of board S before the component mounting, which has been captured by mark camera 26, and recognizes the position of the mark to recognize the position of board S, or processes the image of board S after the component is mounted, which has been captured by mark camera 26, and inspects the mounting state of the component. Further, mounting control device 29 determines whether the component is picked up by nozzle 24 or determines the pickup orientation of the component, based on the image captured by part camera 27.

As shown in FIG. 3, mounting inspection device 30 includes board conveyance device 32 that conveys board S on which a component is mounted by each mounting device 20, inspection camera 34 that captures an image for inspecting the mounting state of the component, camera moving device 36 that moves inspection camera 34 in the XY-directions, and inspection control device 39 that controls entire mounting inspection device 30. Board conveyance device 32 and camera moving device 36 have the same configurations as board conveyance device 21 and head moving device 25 of mounting device 20, respectively.

Inspection control device 39 is constituted of a well-known CPU, ROM, RAM, and the like. Inspection control device 39 outputs drive signals to board conveyance device 32 and camera moving device 36 and imaging signals to inspection camera 34. Further, an image from inspection camera 34 is input to inspection control device 39, and inspection control device 39 processes the image to inspect the mounting state of the component. Further, inspection control device 39 is communicably connected to mounting control device 29 and management control device 42 of management device 40 via LAN 18, and transmits information regarding the inspection status or the inspection result and the like.

As shown in FIG. 3, management device 40 includes management control device 42, storage section 44, input device 46, and display 48. Management control device 42 is constituted of a well-known CPU, ROM, RAM, and the like. Storage section 44 is a device such as an HDD that stores various kinds of information such as a processing program. Input device 46 includes a keyboard, a mouse, and the like for the operator to input various commands. Display 48 is a liquid crystal display device that displays various kinds of information. Further, the production program is stored in storage section 44. In the production program, information on the component type that is mounted on board S, information on the mounting order of each component, information on the mounting position and the mounting angle of each component, information on component supply device 22 that supplies each component, information on nozzle 24 that picks up the component, information on the number of boards S that are produced, and the like are defined. Management control device 42 is communicably connected to mounting control device 29 via LAN 18, and receives information regarding the mounting status from mounting control device 29 or transmits the production program to mounting control device 29. Further, management control device 42 is communicably connected to inspection control device 39 via LAN 18, and receives information regarding the inspection status or the inspection result from inspection control device 39 or transmits information on board S of an inspection target to inspection control device 39. In addition to these, management control device 42 is communicably connected to each control device (not shown) of printing device 12 and print inspection device 14 via LAN 18, and receives information regarding the work status from each device or transmits a work instruction.

Figure 4:
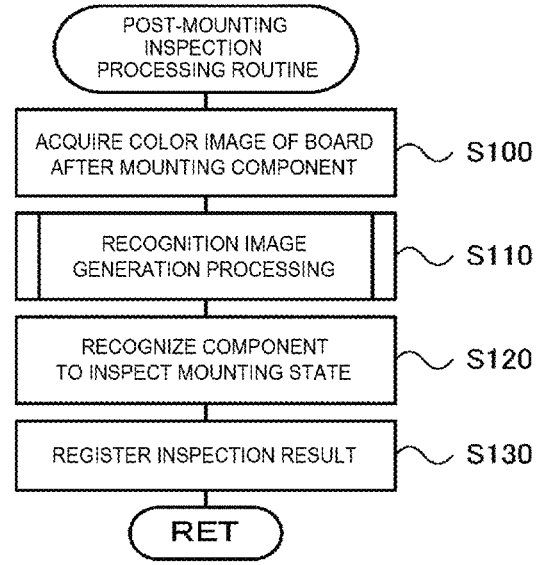
FIG. 4 is a flowchart showing an example of a post-mounting inspection processing routine.

Hereinafter, as an operation of mounting device 20 configured as described heretofore, component mounting processing and inspection processing of board S after the component is mounted will be described. In the component mounting processing, mounting control device 29 first controls head moving device 25 to move head 23 above the component supply position of component supply device 22 and lowers nozzle 24 to make nozzle 24 pick up the component supplied to the component supply position. Next, mounting control device 29 controls head moving device 25 to move head 23 above part camera 27, and controls part camera 27 to image the component picked up by nozzle 24. Subsequently, mounting control device 29 processes the captured image and determines the positional deviation or the like of the component picked up by nozzle 24, to correct a target mounting position of the component so that the positional deviation is eliminated. Then, mounting control device 29 controls head moving device 25 to move head 23 above board S and lowers nozzle 24 to mount the component at the target mounting position on board S. Further, when the mounting of the component on board S is completed, mounting control device 29 of the present embodiment performs the inspection processing for inspecting the mounting state of the component before board S is conveyed out. FIG. 4 is a flowchart showing an example of a post-mounting inspection processing routine.

When this routine is started, mounting control device 29 first acquires a color image of board S after the component is mounted, which has been captured by mark camera 26 (S100). As described above, in the color image captured by mark camera 26, each pixel has gradation values (R, G, B) of the three primary colors of RGB. Next, mounting control device 29 performs recognition image generation processing for recognizing the component from the acquired color image (S110). The details of this generation processing will be described later. Subsequently, mounting control device 29 recognizes the component using the generated recognition image to inspect the mounting state (S120), registers (stores) the inspection result in storage section 28 (S130), and then ends the post-mounting inspection processing routine. In S120, mounting control device 29 acquires, for example, a deviation in the mounting position of the component or a deviation in the mounting angle of the component, and inspects whether the deviation amount in the X-direction and the deviation amount in the Y-direction with respect to the target mounting position are within reference values, whether the rotational deviation amount (angle) with respect to a target mounting angle is within a reference value, or the like. In addition, mounting control device 29 also inspects the presence or absence of lacking components, missing components, or the like.

Figure 5:
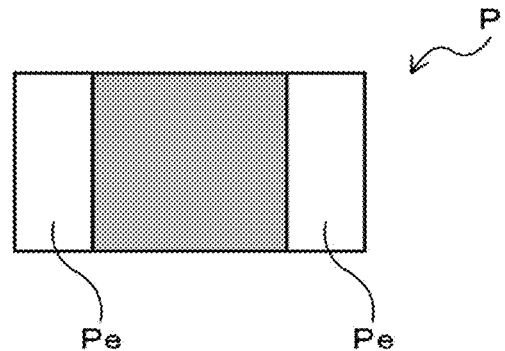
FIG. 5 is a view illustrating an example of component P of the recognition target.
Figure 6:
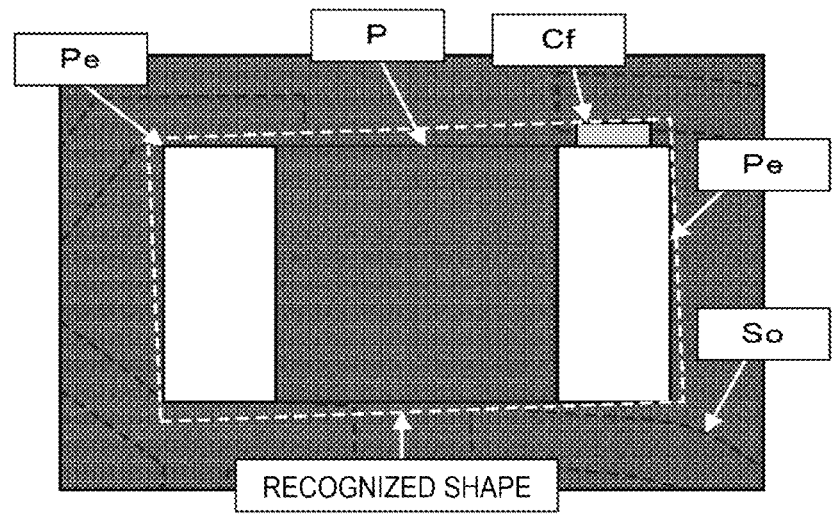
FIG. 6 is a view illustrating an example of a case where an external shape of component P is erroneously recognized in a comparative example.

Here, FIG. 5 is a view illustrating an example of component P of the recognition target. As shown in FIG. 5, for example, component P is a component having a rectangular shape in the top view, having electrodes Pe provided at both ends, and having a middle portion formed of a non-glossy material such as a resin. Therefore, in the image processing, the external shape or the position of component P is recognized using electrodes Pe as the recognition target. Further, FIG. 6 is a view illustrating an example of a case where the external shape of component P is erroneously recognized in a comparative example. FIG. 6 shows a case where the image of board S on which component P of FIG. 5 is mounted is processed. Since electrodes Pe of component P reflect light and glow white when the image is captured, electrodes Pe appear white in the image. Therefore, the gradation values (R, G, B) of electrode Pe are, for example, (255, 255, 255), and the brightness Y has a value of 255 according to the following equation (1).

$$Y = 0.30 \times R + 0.59 \times G + 0.11 \times B \tag{1}$$

Figure 7:
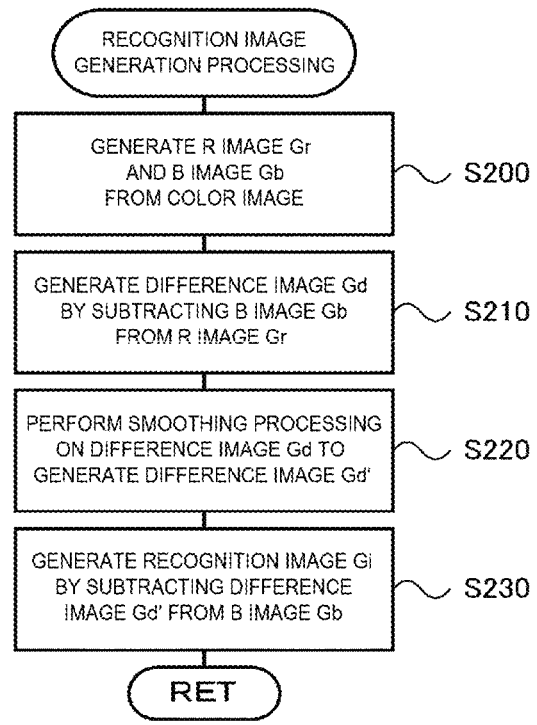
FIG. 7 is a flowchart showing an example of recognition image generation processing.

Further, in the image, copper foil Cf provided on board S, solder So (shown by the dotted line) printed on board S by printing device 12, and the like are also shown. Out of these, copper foil Cf is more likely to reflect light than solder So, and appears orange, yellow, or the like in the image. The gradation values (R, G, B) of copper foil Cf are, for example, (239, 160, 154), and the brightness Y has a value of 183 according to the equation (1). As described above, although the main color component of copper foil Cf is red color (R) close to orange color or yellow color and is different from the main color component of electrode Pe, the brightness Y of copper foil Cf is relatively high and is similar to the brightness Y of electrode Pe. Here, the main color component different from the main color component of electrode Pe of the recognition target means that, in electrode Pe, all the three primary colors have high gradation values because electrode Pe appears white, whereas any one of the three primary colors has a higher gradation value than the gradation values of the other primary colors. In a case where the main color component of the recognition target, that is, the primary color having a high gradation value is any one of the three primary colors, a primary color having a high gradation value, which is different from the one primary color of the recognition target, need only be used as the main color component different from the main color component of the recognition target. Further, the brightness Y similar to the brightness Y of electrode Pe means that the difference between the brightness Y and the brightness Y of electrode Pe is within a predetermined range of about several tens of percent, for example, the difference is within about 30%. Therefore, it is difficult for mounting control device 29 to distinguish and recognize electrode Pe and copper foil Cf when performing image processing on the color image captured by mark camera 26, and copper foil Cf may be erroneously recognized as a part of electrode Pe. In that case, since mounting control device 29 recognizes the shape of component P including a part of copper foil Cf, mounting control device 29 erroneously determines the deviation of the mounting position or the deviation of the mounting angle of component P. For example, FIG. 6 shows an example of a case where mounting control device 29 erroneously recognizes the external shape of component P and erroneously determines that there is a deviation in the mounting angle when there is almost no deviation in the mounting angle of component P. In order to prevent such erroneous recognition, in the present embodiment, the recognition image generation processing of S110 is performed as follows. FIG. 7 is a flowchart showing an example of the recognition image generation processing, and FIG. 8 is a view illustrating an example of a case where recognition image Gi is generated. FIG. 8 shows an image of gradation values that are different from the actual gradation values of each image, in which a part having a high gradation value and a part having low gradation value are actually mixed, for example, even in a case where copper foil Cf part or the like is shown with uniform gradation values.

In the recognition image generation processing of FIG. 7, mounting control device 29 first generates R image Gr (first primary color image) in which a gradation value R of red color is extracted and B image Gb (second primary color image) in which a gradation value B of blue color is extracted, from the gradation values (R, G, B) of each pixel in the color image acquired in S100 described above (S200). As described above, since the main color component of copper foil Cf is orange color or yellow color, mounting control device 29 extracts the gradation value R of red color that is close to orange color or yellow color, out of three primary colors of RGB, to generate R image Gr (see FIG. 8A). Further, mounting control device 29 extracts the gradation value B of blue color that is close to the complementary color to orange color or yellow color, out of the three primary colors of RGB, to generate B image Gb (see FIG. 8B). The gradation value R of red color that is close to the main color component of copper foil Cf is the largest value of the gradation values (R, G, B) of copper foil Cf, and the gradation value B of blue color that is close to the complementary color is the smallest value of the gradation values (R, G, B) of copper foil Cf.

Figure 8A:
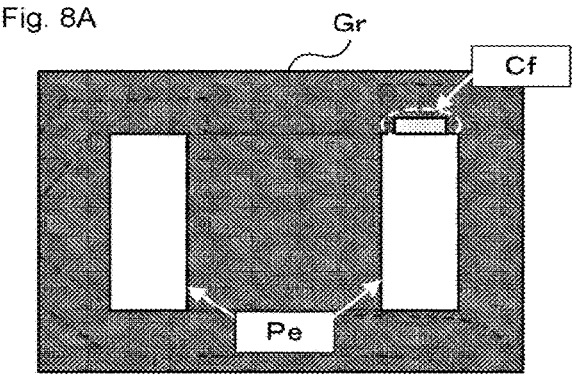
FIG. 8 is a view illustrating an example of a case where recognition image Gi is generated.
Figure 8B:
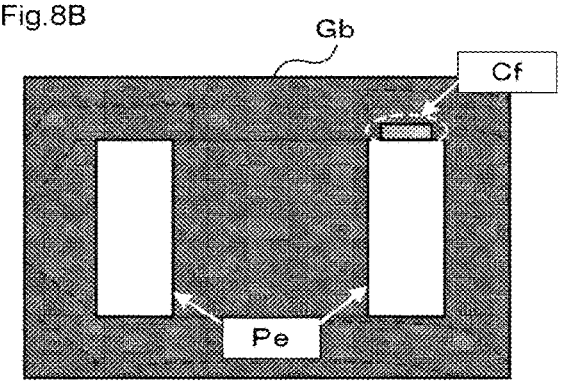
Figure 8C:
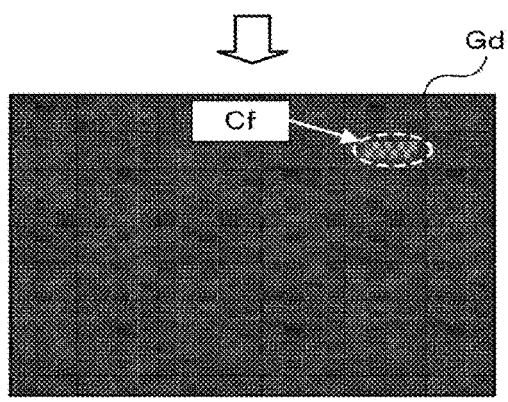
Figure 8D:
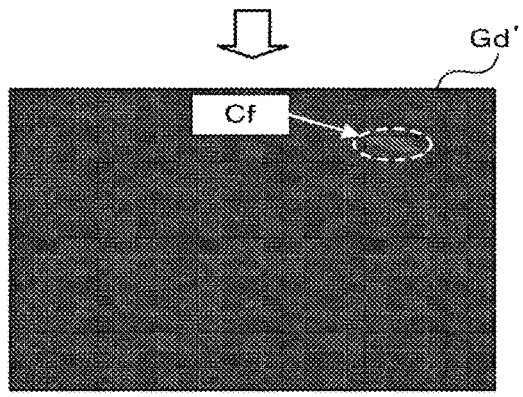

Next, mounting control device 29 generates difference image Gd having a difference gradation value obtained by subtracting the gradation value B of each pixel of B image Gb from the gradation value R of each pixel of R image Gr (S210). For example, since the gradation values (R, G, B) of electrode Pe are (255, 255, 255) and the gradation values (R, G, B) of copper foil Cf are (239, 160, 154), difference image Gd has, for example, a difference gradation value of 0 for electrode Pe part and has, for example, a difference gradation value of 85 for copper foil Cf part. Therefore, as shown in FIG. 8C, in difference image Gd, electrode Pe part and the background part each have a difference value of almost 0 (black), and the difference between the gradation value R and the gradation value B of copper foil Cf emerges in copper foil Cf part. The gradation value R of red color is the largest value and the gradation value B of blue color is the smallest value, out of the gradation values (R, G, B) of copper foil Cf, so that the difference emerges relatively large in copper foil Cf part.

Figure 8E:
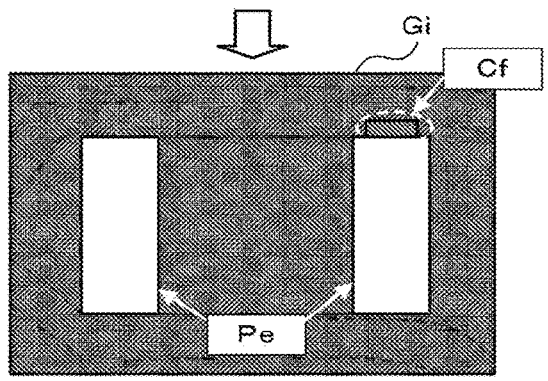

Subsequently, mounting control device 29 performs smoothing processing on difference image Gd to generate difference image Gd' (difference smoothed image, smoothed image, see FIG. 8D) (S220). The smoothing processing of S220 is performed by smoothing and blurring the difference gradation value between the gradation value R and the gradation value B by using, for example, a well-known moving average filter or Gaussian filter, whereby the influence of noise or the like can be excluded. Then, mounting control device 29 generates recognition image Gi having a gradation value obtained by subtracting the gradation value of each pixel of difference image Gd' from the gradation value of each pixel of B image Gb (S230), and then ends the recognition image generation processing. Here, in B image Gb, the gradation value of copper foil Cf part is not as high as R image Gr, and recognition image Gi is generated by subtracting difference image Gd' from B image Gb, so that the gradation value of copper foil Cf part can be further reduced in recognition image Gi. Therefore, as shown in FIG. 8E, recognition image Gi is an image in which the brightness of copper foil Cf part is lower than the brightness of each of the original color image (see FIG. 6), R image Gr of FIG. 8A, and B image Gb of FIG. 8B. On the other hand, electrode Pe part has a high gradation value (B=255) even in B image Gb, and there is almost no difference in electrode Pe part, such as a difference value of 0, even in difference image Gd (Gd'). Therefore, in recognition image Gi, the brightness of electrode Pe part is substantially the same as that of the original color image. Accordingly, when mounting control device 29 recognizes component P using recognition image Gi in S120, it is possible to recognize electrode Pe appropriately by preventing copper foil Cf from being included in electrode Pe and the external shape of component P from being erroneously recognized.

As described above, although copper foil Cf appears orange or yellow in the color image, for example, a portion of copper foil Cf, such as the central portion, appears white depending on the condition of light reflection and may have gradation values (R, G, B) of (255, 255, 255) or values close to (255, 255, 255). In that case, in difference image Gd generated in S210, the portion of copper foil Cf has the same difference value of 0 as in electrode Pe, and a difference between the gradation value R and the gradation value B as described above occurs in the remaining portion of copper foil Cf. Then, in a case where mounting control device 29 subtracts difference image Gd from B image Gb to generate recognition image Gi without performing the smoothing processing of S220, the remaining portion of copper foil Cf has reduced brightness and the portion of copper foil Cf has the same original brightness as in electrode Pe. In that case, there is a concern that mounting control device 29 may erroneously recognize the boundary between the portion and the remaining portion of copper foil Cf as the boundary of electrode Pe or the like. In response to this, in a case where mounting control device 29 performs the smoothing processing of S220, the difference generated in the remaining portion of copper foil Cf is dispersed to the portion of copper foil Cf so that it is possible to restrain only the portion of copper foil Cf from having extremely different brightness from the remaining portion. With this, it is possible to reduce the concern that mounting control device 29 may erroneously recognize the boundary between the portion and the remaining portion of copper foil Cf. In this manner, in order to reduce the influence of the sudden change in the difference and restrain erroneous recognition, the smoothing processing of S220 is performed in the present embodiment.

Here, a correspondence relationship between constituent elements of the present embodiment and constituent elements of the present disclosure will be clarified. Mounting control device 29 that executes S100 of the post-mounting inspection processing routine of FIG. 4 of the present embodiment corresponds to the image acquiring section, mounting control device 29 that executes S200 to S220 of the recognition image generation processing of FIG. 7 corresponds to the difference image generating section, mounting control device 29 that executes S230 of the recognition image generation processing corresponds to the recognition image generating section, and mounting control device 29 that executes S120 of the post-mounting inspection processing routine corresponds to the recognition processing section. Further, mark camera 26 corresponds to the imaging device, mounting control device 29 corresponds to the image processing device, and component mounting system 10 corresponds to the component mounting system. In the present embodiment, the operation of mounting control device 29 is described, whereby an example of the image processing method of the present disclosure is also clarified.

Mounting control device 29 of the present embodiment described above generates difference image Gd obtained by subtracting B image Gb (second primary color image) from R image Gr (first primary color image). Therefore, the gradation value of difference image Gd is the difference between red color (first primary color) close to the main color component in copper foil Cf, which is a similar part having similar brightness to electrode Pe of component P, and blue color (second primary color) except the red color. Further, since the brightness of copper foil Cf can be reduced in recognition image Gi because recognition image Gi is generated by subtracting difference image Gd (Gd') from B image Gb, so that it is possible to restrain copper foil Cf from being erroneously recognized as electrode Pe. Accordingly, it is possible to accurately recognize electrode Pe of the recognition target without setting the RGB gradation values, which have to be excluded, in advance before capturing the image.

Further, mounting control device 29 uses B image Gb in which the gradation value of blue color that is close to the complementary color to the main color component of copper foil Cf is extracted, so that it is possible to further reduce the brightness of copper foil Cf in recognition image Gi by increasing the difference between red color close to the main color component and blue color close to the complementary color to the main color component, as compared with a case of extracting a gradation value of green color.

Further, mounting control device 29 generates the difference image Gd' having a gradation value obtained by smoothing the difference obtained by subtracting B image Gb from R image Gr, so that it is possible to restrain copper foil Cf from being erroneously recognized as electrode Pe by reducing the influence of the sudden change in the difference in recognition image Gi.

It goes without saying that the present disclosure is not limited to the above-mentioned embodiments and may be carried out in various aspects within the technical scope of the present disclosure.

For example, in the above-mentioned embodiments, recognition image Gi is generated using difference image Gd' having a gradation value obtained by smoothing the difference obtained by subtracting B image Gb from R image Gr; however, the configuration is not limited to this. For example, recognition image Gi may be generated using difference image Gd obtained by subtracting B image Gb from R image Gr as it is without being subjected to the smoothing processing.

In the above-mentioned embodiments, difference image Gd is generated using B image Gb in which the gradation value of blue color close to the complementary color to the main color component of copper foil Cf is extracted; however, the configuration is not limited to the image that uses the complementary color, and a primary color image that uses other colors of the primary colors need only be used. That is, G image Gg may be generated as the second primary color image by extracting a gradation value G of green color, out of the three primary colors of RGB, and the difference image Gd (Gd') may be generated by subtracting G image Gg from R image Gr. In that case, recognition image Gi need only be generated by subtracting difference image Gd (Gd') from the G image Gg. In a case where R image Gr is the first primary color image and B image Gb is the second primary color image, recognition image Gi is generated by subtracting difference image Gd (Gd') from B image Gb which is the second primary color image; however, the configuration is not limited to this, and recognition image Gi may be generated by subtracting difference image Gd (Gd') from any one of the primary color images such as R image Gr, which is the first primary color image, and G image Gg.

In the above-mentioned embodiments, the processing of excluding copper foil Cf provided on board S as the similar part is shown as an example; however, the configuration is not limited to this, and solder So printed on board S by the printing device 12 or the like may be excluded as the similar part, and board S itself may be excluded as the similar part.

In the above-mentioned embodiments, the present disclosure is applied to the inspection processing performed by mounting device 20; however, the configuration is not limited to this, and the present disclosure may be applied to the inspection processing performed by mounting inspection device 30. In that case, inspection control device 39 need only be used as the image processing device to perform the same processing. Further, the configuration is not limited to mounting control device 29 and inspection control device 39, and the management control device 42 of management device 40 may be used as the image processing device to perform the same processing. Alternatively, for example, two or more devices may collaborate on the processing, for example, mounting control device 29 acquires the color image and generates difference image Gd (Gd') and recognition image Gi, and inspection control device 39 or management control device 42 performs the recognition processing (inspection processing) using recognition image Gi. Alternatively, the configuration is not limited to a case where the present disclosure is applied to the inspection processing of board S after the component is mounted, and the present disclosure may be applied to the inspection processing for inspecting the coating state of solder So before the component mounting. In that case, the control device of print inspection device 14 need only be used as the image processing device to perform the same processing.

In the above-mentioned embodiments, component P having a rectangular shape in the top view and having both ends at which electrodes Pe are provided is shown as an example of the recognition target; however, the configuration is not limited to this, and a component in which electrodes Pe are not provided at both ends, a component having a shape other than a rectangular shape such as a circular shape in the top view, or the like may be used as the recognition target. Further, component P mounted on board S is used as the recognition target; however, the configuration is not limited to this, and a component that has not been mounted on board S, such as a component that is supplied to the component supply position by component supply device 22 and a component that is picked up by nozzle 24 at the component supply position and then is temporarily placed at a predetermined location, may be used as the recognition target.

In the above-mentioned embodiments, an example is shown in which the present disclosure is applied to the image processing necessary for the inspection in the mounting processing for mounting component P on board S; however, the configuration is not limited to the image processing necessary for the inspection in the mounting processing, and the present disclosure may be applied to image processing or the like, for example, for inspecting the presence or absence of foreign matter adhering to a product by using the foreign matter as the recognition target.

Here, the image processing device of the present disclosure may be configured as follows. For example, in the image processing device of the present disclosure, the recognition image generating section may be configured to generate an image having a gradation value obtained by subtracting the gradation value of the difference image from the gradation value of the second primary color image, as the recognition image. The gradation value of the second primary color image in the similar part is not as high as the gradation value of the first primary color image, and the brightness is reduced. Therefore, it is possible to further reduce the brightness of the similar part in the recognition image by subtracting the difference image from the second primary color image, so that it is possible to further restrain the similar part from being erroneously recognized as the recognition target. Further, since the second primary color image is an image that is used to generate the difference image, it is possible to perform the processing promptly without preparing a new primary color image.

In the image processing device of the present disclosure, the difference image generating section may be configured to use, as the second primary color image, an image in which a primary color that is close to a complementary color to the main color component of the similar part, out of the three primary colors of RGB, is used as the second primary color. By doing so, the difference between the gradation value of the first primary color image and the gradation value of the second primary color image, that is, the gradation value of the difference image becomes larger, so that it is possible to reduce the gradation value obtained by subtracting the gradation value of the difference image from the gradation value of the second primary color image. Therefore, it is possible to further reduce the brightness of the similar part in the recognition image, so that it is possible to further restrain the similar part from being erroneously recognized as the recognition target.

In the image processing device of the present disclosure, the difference image generating section may be configured to generate an image having a gradation value obtained by smoothing the difference obtained by subtracting the gradation value of the second primary color image from the gradation value of the first primary color image, as the difference image. By doing so, it is possible to restrain the sudden change in the difference between pixels of the difference image, so that the sudden change in the gradation values can be reduced in the similar part in the recognition image. Therefore, it is possible to restrain a part where the gradation values are suddenly changed in the similar part from being erroneously recognized as the boundary of the recognition target or the like.

A gist of a component mounting system of the present disclosure that mounts a component on a board is a component mounting system including: an imaging device configured to capture a color image of the board on which the component is mounted; and the image processing device according to any of the present disclosure configured to process the color image including the component mounted on the board as the recognition target.

The component mounting system of the present disclosure includes the imaging device that captures the color image of the board on which the component is mounted; and the image processing device according to any of the present disclosure that processes the color image including the component mounted on the board as the recognition target. Accordingly, as in the above-mentioned image processing device, it is possible to accurately recognize the recognition target without setting the RGB gradation values, which have to be excluded, in advance.

A gist of an image processing method of the present disclosure of processing a color image in which each pixel has gradation values of three primary colors of RGB is an image processing method including: (a) a step of acquiring an image including a recognition target and a similar part of which a main color component is different from a main color component of the recognition target and brightness is similar to brightness of the recognition target, as the color image; (b) a step of using a first primary color image in which a gradation value of a first primary color that is close to the main color component of the similar part, out of the three primary colors of RGB, is extracted from the color image and a second primary color image in which a gradation value of a second primary color except the first primary color is extracted from the color image, to generate a difference image having a gradation value based on a difference obtained by subtracting the gradation value of the second primary color image from the gradation value of the first primary color image; (c) a step of generating a recognition image having a gradation value obtained by subtracting the gradation value of the difference image from a gradation value of an image in which any one of the three primary colors of RGB is extracted from the color image; and (d) a step of performing recognition processing of the recognition target using the recognition image.

The image processing method of the present disclosure generates the difference image having the gradation value based on the difference obtained by subtracting the gradation value of the second primary color image from the gradation value of the first primary color image, and generates the recognition image by subtracting the gradation value of the difference image from the gradation value of any one of the primary color images, as in the above-mentioned image processing device. Accordingly, it is possible to accurately recognize the recognition target without setting the RGB gradation values, which have to be excluded, in advance. In this image processing method, various aspects of the above-mentioned image processing device may be employed, or steps for realizing each function of the image processing device may be added.

INDUSTRIAL APPLICABILITY

The present disclosure can be used in, for example, technical fields such as image processing of color images and component mounting processing.

REFERENCE SIGNS LIST

10: component mounting system, 12: printing device, 14: print inspection device, 18: LAN, 20: mounting device, 21, 32: board conveyance device, 22: component supply device, 23: head, 24: nozzle, 25: head moving device, 26: mark camera, 27: part camera, 28: storage section, 29: mounting control device, 30: mounting inspection device, 34: inspection camera, 36: camera moving device, 39: inspection control device, 40: management device, 42: management control device, 44: storage section, 46: input device, 48: display, Cf: copper foil, Gd, Gd': difference image, Gb: B image, Gi: recognition image, Gr: R image, P: component, Pe: electrode, S: board, So: solder

The invention claimed is:

1. A component mounting system that mounts a component on a board, comprising:
  a camera configured to capture a color image of the board on which the component is mounted; and
  a processor configured to
    process the color image including the component mounted on the board as a recognition target in which each pixel of the color image has gradation values of three primary colors of RGB by:
      acquiring an image including the recognition target and a similar part of which a main color component is different from a main color component of the recognition target and brightness is similar to brightness of the recognition target, as the color image;

using a first primary color image in which a gradation value of a first primary color that is close to the main color component of the similar part, out of the three primary colors of RGB, is extracted from the color image and a second primary color image in which a gradation value of a second primary color except the first primary color is extracted from the color image, to generate a difference image having a gradation value based on a difference obtained by subtracting the gradation value of the second primary color image from the gradation value of the first primary color image;

generating a recognition image having a gradation value obtained by subtracting the gradation value of the difference image from a gradation value of an image in which any one of the three primary colors of RGB is extracted from the color image; and performing recognition processing of the component using the recognition image; and inspect a mounting state of the component by comparing mounting information based on the recognition image to target mounting information, and determine that the mounting state of the component is acceptable when a deviation amount of the mounting information with respect to the target mounting information is less than or equal to a predetermined value.

2. The component mounting system according to claim 1, wherein the processor is configured to generate an image having a gradation value obtained by subtracting the gradation value of the difference image from the gradation value of the second primary color image, as the recognition image.

3. The component mounting system according to claim 1, wherein the processor is configured to use, as the second primary color image, an image in which a primary color that is close to a complementary color to the main color component of the similar part, out of the three primary colors of RGB, is used as the second primary color.

4. The component mounting system according to claim 1, wherein the processor is configured to generate an image having a gradation value obtained by smoothing the difference obtained by subtracting the gradation value of the second primary color image from the gradation value of the first primary color image, as the difference image.

5. An inspection method of a component mounted on a board comprising:

capturing a color image of the board on which the component is mounted;

performing an image processing method of processing the color image including the component mounted on the board as a recognition target in which each pixel of the color image has gradation values of three primary colors of RGB, the image processing method comprising:

(a) acquiring an image including the recognition target and a similar part of which a main color component is different from a main color component of the recognition target and brightness is similar to brightness of the recognition target, as the color image;

(b) using a first primary color image in which a gradation value of a first primary color that is close to the main color component of the similar part, out of the three primary colors of RGB, is extracted from the color image and a second primary color image in which a gradation value of a second primary color except the first primary color is extracted from the color image, to generate a difference image having a gradation value based on a difference obtained by subtracting the gradation value of the second primary color image from the gradation value of the first primary color image;

(c) generating a recognition image having a gradation value obtained by subtracting the gradation value of the difference image from a gradation value of an image in which any one of the three primary colors of RGB is extracted from the color image; and (d) performing recognition processing of the recognition target using the recognition image; and inspecting a mounting state of the component by comparing mounting information based on the recognition image to target mounting information, and determine that the mounting state of the component is acceptable when a deviation amount of the mounting information with respect to the target mounting information is less than or equal to a predetermined value.

6. The component mounting system according to claim 1, wherein
the component includes an electrode, and the board includes copper foil.

7. The inspection method according to claim 5, wherein the component includes an electrode, and the board includes copper foil.

* * * * *